(12) United States Patent
Faltermeier et al.

(10) Patent No.: US 12,542,322 B2
(45) Date of Patent: Feb. 3, 2026

(54) RECEIVING STRUCTURE FOR BATTERY CELLS AND METHOD FOR PRODUCING A RECEIVING STRUCTURE FOR BATTERY CELLS

(71) Applicant: LISA DRÄXLMAIER GMBH, Vilsbiburg (DE)

(72) Inventors: Peter Faltermeier, Landshut (DE); Michael Steckel, Vilsbiburg (DE); Alexander Hahn, Röttenbach (DE); Stefan Seidl, Landshut (DE)

(73) Assignee: Lisa Dräxlmaier GmbH, Vilsbiburg (DE)

( * ) Notice: Subject to any disclaimer, the term of this patent is extended or adjusted under 35 U.S.C. 154(b) by 668 days.

(21) Appl. No.: 17/670,440

(22) PCT Filed: Jul. 30, 2020

(86) PCT No.: PCT/EP2020/071583
§ 371 (c)(1),
(2) Date: Feb. 12, 2022

(87) PCT Pub. No.: WO2021/028237
PCT Pub. Date: Feb. 18, 2021

(65) Prior Publication Data
US 2024/0030533 A1 Jan. 25, 2024

(30) Foreign Application Priority Data
Aug. 12, 2019 (DE) .................... 10 2019 121 669.9

(51) Int. Cl.
*H01M 50/22* (2021.01)
*H01M 10/613* (2014.01)
(Continued)

(52) U.S. Cl.
CPC ......... *H01M 50/22* (2021.01); *H01M 10/613* (2015.04); *H01M 10/625* (2015.04);
(Continued)

(58) Field of Classification Search
CPC .. H01M 50/22; H01M 10/613; H01M 10/625; H01M 10/643; H01M 10/6557;
(Continued)

(56) References Cited

U.S. PATENT DOCUMENTS

2007/0259258 A1    11/2007   Buck
2017/0162921 A1*   6/2017   Schuhmann ........ H01M 50/519

FOREIGN PATENT DOCUMENTS

CN    106129294 A   * 11/2016  ......... H01M 10/613
CN    106129294      1/2019
(Continued)

OTHER PUBLICATIONS

DE102011009768 English Language Translation.
CN106129294A English Language Translation.
DE1020144206868A1 English Language Translation.

*Primary Examiner* — Daniel S Gatewood
(74) *Attorney, Agent, or Firm* — BelayIP

(57) ABSTRACT

The present disclosure sets out a receiving structure for battery cells and, in particular for a high-voltage battery for a motor vehicle, the structure including a cell holder made of a foam material with recesses for receiving and fixing the respective battery cells, the cell holder being shaped in such a way that, when the battery cells are arranged in the recesses as intended, at least one region is left free at the respective battery cells, so that an electrically non-conductive cooling medium can flow around this region. The disclosure further sets out a battery and in particular a high-voltage battery for a motor vehicle, having at least one
(Continued)

such receiving structure as well as to a method for producing a receiving structure for battery cells.

6 Claims, 2 Drawing Sheets

(51) Int. Cl.
| | |
|---|---|
| H01M 10/625 | (2014.01) |
| H01M 10/643 | (2014.01) |
| H01M 10/6557 | (2014.01) |
| H01M 10/6568 | (2014.01) |
| H01M 50/213 | (2021.01) |
| H01M 50/244 | (2021.01) |
| H01M 50/249 | (2021.01) |

(52) U.S. Cl.
CPC ..... *H01M 10/643* (2015.04); *H01M 10/6557* (2015.04); *H01M 10/6568* (2015.04); *H01M 50/213* (2021.01); *H01M 50/244* (2021.01); *H01M 50/249* (2021.01); *H01M 2220/20* (2013.01)

(58) Field of Classification Search
CPC ........... H01M 10/6568; H01M 50/213; H01M 50/244; H01M 50/249; H01M 2220/20; H01M 50/20; H01M 10/6567; H01M 50/198; Y02E 60/10; A62C 3/16
See application file for complete search history.

(56) References Cited

FOREIGN PATENT DOCUMENTS

| DE | 102011009768 | | 8/2012 | |
|---|---|---|---|---|
| DE | 102011009768 | A1 * | 8/2012 | ............ H01G 11/10 |
| DE | 102014206868 | | 10/2015 | |
| DE | 102015121107 | | 6/2017 | |

* cited by examiner

RECEIVING STRUCTURE FOR BATTERY CELLS AND METHOD FOR PRODUCING A RECEIVING STRUCTURE FOR BATTERY CELLS

CROSS REFERENCE TO RELATED APPLICATIONS

This application is a national phase application of PCT/EP2020/071583, filed Jul. 30, 2020, and claims priority to German patent application DE102019121669.9, filed Aug. 12, 2019, the both of which are herein incorporated by reference.

BACKGROUND OF THE INVENTION

Field of the Invention

The present invention relates to a housing structure for battery cells, in particular of a high-voltage battery for a motor vehicle. Furthermore, the invention relates to a battery, in particular a high-voltage battery for a motor vehicle, having at least one such accommodation structure, as well as a method for manufacturing an accommodation structure for battery cells.

Description of Related Art

In electrically powered vehicles, the energy for driving the vehicle is usually taken from a battery. The electric motor for driving the motor vehicle consumes a high level of electrical power, particularly when the motor vehicle accelerates. When energy is drawn from the battery, the sum of all resistances, for example due to internal resistances within the battery cells, due to contact resistances and the like, results in power loss as a function of the flowing current, which is converted into heat. The power dissipation heats up the battery or the battery cells, so that without dissipation of this thermal energy the battery or the battery cells would overheat.

For this reason, batteries are usually cooled. If a non-conductive medium is used for cooling, for example transformer oil, the battery cells can come into direct contact with this medium. The cooling medium flows past the heated battery cells, absorbs the heat and flows around other battery cells, and is then discharged. The achievable cooling capacity is determined, among other things, by the size of the cooled areas of the battery cells and the position of those areas that are cooled. Cooling battery cells by directly flowing an electrically non-conductive cooling medium around the battery cells can complicate the design of such batteries. At the same time, crash, shock and vibration requirements usually have to be met.

BRIEF SUMMARY OF THE INVENTION

It is therefore the task of the present invention to provide a solution by means of which, on the one hand, battery cells can be cooled particularly efficiently and, on the other hand, a particularly simple construction of a battery is made possible.

This task is solved by a receiving structure for battery cells having the features of patent claim 1. Further possible embodiments of the invention are indicated in particular in the dependent claims.

The receiving structure for battery cells according to the invention, in particular for battery cells of a high-voltage battery for a motor vehicle, comprises a cell holder made of a foam material with recesses for receiving and fixing the respective battery cells. The cell holder is shaped in such a way that, when the battery cells are arranged in the recesses as intended, at least one region is recessed at the respective battery cells so that an electrically non-conductive cooling medium can flow around this region. The geometry of the recesses can be matched to the battery cells in such a way that, when arranged as intended within the recesses, they can be held non-positively by means of the cell holder.

In particular, the invention is based on the knowledge that a required cooling capacity for battery cells is achieved when, at maximum power consumption by the battery cells concerned, a maximum permissible temperature is not exceeded at the battery cells due to cooling with the electrically non-conductive cooling medium. An increase in a cooling surface, i.e. in areas on the battery cells around which the electrically non-conductive cooling medium can flow, would then no longer bring any advantage. Such electrically non-conductive cooling media, such as transformer oil, are relatively expensive on the one hand and relatively heavy on the other. Therefore, the amount of electrically non-conductive cooling medium used should be minimized as far as possible, to such an amount that sufficient cooling of the battery cells can be ensured.

Battery cells are usually arranged in cell frames, whereby these cell frames, in addition to the actual task of fixing and holding the battery cells, should also be able to compensate for dimensional fluctuations in the battery cells that are usually due to tolerances. The battery cells accommodated within such cell frames are usually connected and interconnected to form a battery or energy storage system. If the battery cells are then to be cooled with the electrically non-conductive cooling medium, the electrically non-conductive cooling medium must be able to circulate within such cell frames.

In the receiving structure according to the invention, the cell holder made of the foam ensures that the battery cells to be received can be positioned and fixed in their intended position. The cell holder can be a foam block which has the recesses for receiving and fixing the battery cells. By means of the cell holder made of the foam, it is possible in a particularly simple manner to compensate for tolerance-related dimensional variations in the battery cells to be accommodated. In addition, the cell holder made of the foam displaces a certain volume within a battery module or within a battery, so that considerably less electrically non-conductive cooling medium has to be used than is otherwise possible with direct cooling of battery cells.

In addition, the cell holder made from the foam can act as a crash pad so that, for example, otherwise necessary fastening devices within a battery module or battery can now be designed to be less robust. Furthermore, by means of the cell holder made of the foam material, it is possible to provide structures for coolant guidance in order to be able to flow appropriately to the battery cells for the most efficient cooling possible. Even if the receptacle structure comprises a cell frame, the cell holder made from the foam provides additional structural stiffening. Any cell frame that may be used can thus be made less robust or solid. In addition, the cell holder made of the foam material ensures that fewer vibrations are transmitted to the accommodated battery cells, which can contribute to an increase in the service life of the battery cells, among other things. Furthermore, the cell holder made of foam reduces the risk of damage or destruction of the battery cells held by the cell holder.

The fact that the cell holder with its recesses is shaped in such a way that, when the battery cells are arranged in the recesses as intended, at least one respective area is recessed at the respective battery cells, the electrically non-conductive cooling medium can flow around these recessed areas so that a correspondingly necessary cooling capacity can be achieved. Overheating of the battery cells can thus be prevented, while at the same time relatively little of the electrically non-conductive cooling medium is required to cool the battery cells to a sufficient extent due to the above-mentioned reasons. This is because the cell holder made from the foam displaces corresponding volumes within battery modules or batteries, so that it is not necessary to use an excessive amount of the electrically non-conductive and usually expensive cooling medium.

One possible embodiment of the invention provides that the foam is closed-cell. This ensures that the foam does not become saturated with the electrically conductive cooling medium. This in turn helps to ensure that particularly little of the electrically non-conductive cooling medium is sufficient to achieve adequate cooling performance in the battery cells.

Another possible embodiment of the invention provides that the foam is a rigid foam. Thus, a particularly stable structure is created by the cell holder. In particular, it is possible that the foam from which the cell holder is made has at least certain elastic properties, so that reliable and good tolerance compensation for dimensional fluctuations in the battery cells can be achieved by this.

According to a further possible embodiment of the invention, it is provided that the foam is self-extinguishing. In other words, the foam has such properties that, after removal of an ignition source, the foam extinguishes itself again within a short time, i.e. does not continue to burn. In other words, the foam is designed to be flame-retardant. So if a fire should occur, for example in the battery cells, the cell holder made of the foam has a self-extinguishing or fire-retardant effect.

In a further possible embodiment of the invention, it is provided that the recesses are cylindrical and are designed for radial fixing of the battery cells designed as round cells, with at least respective end faces of the round cells being exposed when the round cells are arranged in the recesses as intended. In this context, the invention is based on the realization that in round cells, heat conduction from the interior of the cells to the outside usually occurs to a greater extent in the axial direction than in the radial direction. As a result of the fact that the respective end faces of the round cells are exposed in their intended arrangement, particularly effective cooling of the battery cells can be achieved. In the case of the accommodation structure, however, it is also possible for the cell holder made of the foam to have recesses for accommodating differently shaped battery cells, such as prismatic cells, pouch cells and the like.

Another possible embodiment of the invention provides that the receiving structure comprises a cell frame, wherein the cell holder is arranged at least partially within the cell frame. The cell frame may serve to provide additional stiffening of the receiving structure, depending on what the stiffness requirements are and what foam the cell holder is made of.

According to a further possible embodiment of the invention, it is provided that the cell frame has two frame halves, the cell holder being arranged at least partially in a receiving space enclosed by the frame halves. This makes it possible to arrange and fix the cell holder particularly easily within the cell frame. It is also possible that the cell frames are welded together, for example, so that the cell frame can be of particularly tight design. It is also possible that the cell holder made of the foam is not arranged completely inside the cell frame, but also a little outside the cell frame.

According to another possible embodiment of the invention, it is provided that the cell frame is liquid-tight and the cell holder is arranged entirely within the cell frame, which has connections for supplying and discharging the electrically non-conductive cooling medium. This can ensure that none of the electrically conductive cooling medium leaks out of the cell frame. The cell frame with the cell holder arranged therein thus forms a closed unit through which the electrically non-conductive cooling medium can flow in order to dissipate excess heat from the battery cells concerned.

The battery according to the invention, in particular a high-voltage battery for a motor vehicle, comprises at least one receiving structure according to the invention or an advantageous embodiment of the receiving structure according to the invention, by means of which a plurality of battery cells are received and fixed, and a cooling system for cooling the battery cells with an electrically non-conductive cooling medium.

One possible embodiment of the battery provides that the receiving structure is arranged in a liquid-tight housing of the battery, which has connections for supplying and discharging the electrically non-conductive cooling medium. This separate enclosure of the receiving structure can ensure that none of the electrically non-conductive cooling medium escapes.

In the method according to the invention for producing a receiving structure for battery cells, in particular a high-voltage battery for a motor vehicle, a cell holder with recesses for receiving and fixing the respective battery cells of the receiving structure is produced from a foam, the cell holder being shaped in such a way that, when the battery cells are arranged in the recesses as intended, at least one region is left free at the respective battery cells, so that an electrically non-conductive cooling medium can flow around this region. Possible embodiments of the receptacle structure according to the invention can be produced by means of corresponding embodiments of the method according to the invention, and vice versa.

One possible embodiment of the method provides that the cell holder is manufactured as a single part from a foam block and is inserted into a cell frame of the receiving structure. In other words, the cell holder can thus be manufactured in one piece and arranged in a cell frame of the receiving structure, in particular inserted into the cell frame. This can result in particularly simple handling of the cell holder. In addition, it is thus possible to manufacture the cell holder as a separate component and, for example, to connect it to the cell frame at another production site.

An alternative possible embodiment of the process provides that a cell frame of the receiving structure is arranged in a foaming tool and then the foam is foamed into the cell frame to form the cell holder. This results in particularly good utilization of space and fixation of the cell holder. In addition, tolerances are reduced in the manufacture of the receptacle structure.

Another possible alternative embodiment of the process provides that a first frame half of a cell frame of the receiving structure is arranged in a foaming tool and then the first frame half of the cell frame is filled with the foam, forming the cell holder, in such a way that the foam protrudes over the first frame half, after which a second frame half of the cell frame is slipped over the protruding foam and connected to the first frame half. In this way, the first frame half can be filled with the foam, making particularly good use of the available space. The second half of the frame can then be easily slipped over the area of the cell holder made of the foam that protrudes over the first half of the frame.

Another alternative possible embodiment, of the method provides that two frame halves of a cell frame of the receiving structure are arranged in respective foaming tools and thereafter filled with the foam forming respective parts of the cell holders, after which the frame halves filled with the foam are closed and joined together. The two frame halves filled with the foam can, for example, be clipped, screwed and/or otherwise connected to each other. Thus, it may be provided that the cell holder is made of two parts, each of which is made of said foam. The respective parts of the cell holders can thus be fitted into the respective frame halves of the cell frame during the foaming process, making particularly good use of space.

Further advantages, features and details of the invention may be obtained from the following description of possible embodiments and from the drawing. The features and combinations of features mentioned above in the description as well as the features and combinations of features shown below in the figure description and/or in the figures alone can be used not only in the combination indicated in each case, but also in other combinations or on their own, without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure.

In the following, advantageous examples of the invention are explained with reference to the accompanying figures, wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
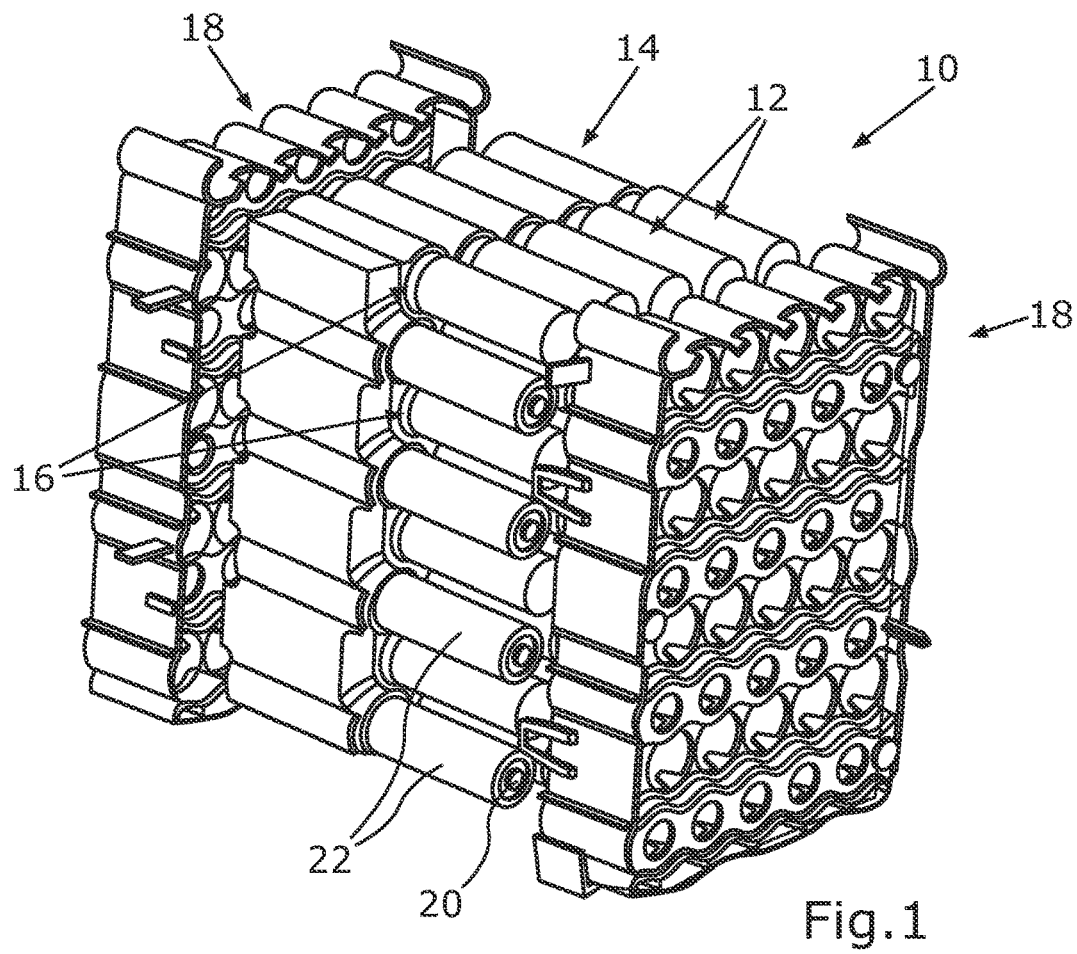
FIG. 1 depicts a perspective exploded view of a receiving structure for battery cells, comprising a cell frame with two frame halves for receiving a cell holder made of a foam material with recesses for receiving and fixing respective battery cells.

FIG. 1 depicts an exploded perspective view of a housing structure 10 for battery cells 12. In the case shown here, the battery cells 12 are round cells. However, the following explanations also apply to battery cells of other shapes, for example in the form of prismatic battery cells, pouch cells and the like. In particular, the battery cells 12 may be battery cells for a high-voltage battery of an electrically driven motor vehicle.

The receiving structure 10 comprises a cell holder 14 made of a foam material, which has respective recesses 16 for receiving and fixing the respective battery cells 12. The cell holder 14 is shaped in such a way that, when the battery cells 12 are arranged in the recesses 16 as intended, at least one region at the respective battery cells 12 is recessed so that an electrically non-conductive cooling medium can flow around the respective regions. In the case shown here, the cell holder 14 serves to receive the battery cells 12 designed as round cells. Accordingly, the recesses 16 are cylindrical in shape and are designed for radial fixing of the battery cells 12 designed as round cells.

When the battery cells 12, which are designed as round cells, are arranged in the recesses 16 as intended, at least respective end faces 20 are not covered by the cell holder 14. The electrically non-conductive cooling medium, for example in the form of transformer oil, can therefore flow around the respective recessed end faces 20 and thus dissipate excess heat from the battery cells 12. Respective shell surfaces 22 are enclosed by the recesses 16 so that the battery cells 12 remain positioned and fixed within the recesses 16. The recesses 16 may, for example, be dimensioned such that they can frictionally retain the battery cells 12.

The receiving structure 10 further comprises two frame halves 18, which form an unspecified cell frame. Once the mounting structure 10 is fully assembled, the cell holder 14 is at least partially disposed within the cell frame formed by the two frame halves 18. The two frame halves 18 form an unspecified receiving space for receiving the cell holder 14 when the two frame halves 18 have been assembled together. In a departure from the present embodiment, it is also possible for the cell frame formed from the two frame halves 18 to be fluid-tight and for the cell holder 14 to be disposed entirely within the cell frame formed from the two frame halves 18 when the receiving structure 10 is in its fully assembled state. The cell frame may have connections, not shown here, for supplying and discharging the electrically non-conductive cooling medium.

The foam from which the cell holder 14 is made can be of closed-cell design so that the foam does not become saturated with the electrically non-conductive cooling medium. In addition, the foam may be a rigid foam. Furthermore, it is possible that the foam is self-extinguishing, so that it has a correspondingly good fire-retardant effect.

Figure 2:
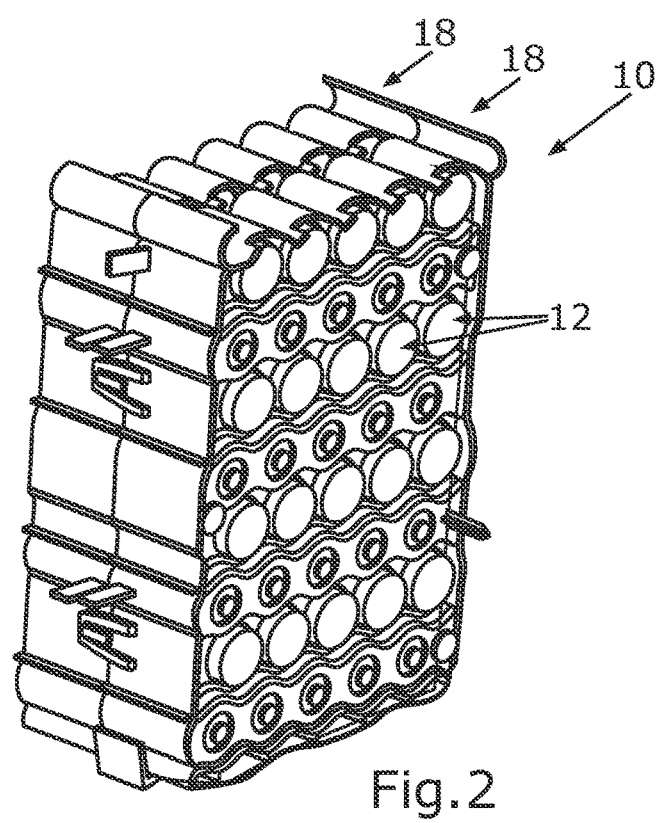
FIG. 2 depicts perspective view of the receiving structure in the assembled state.

In FIG. 2, the receptacle structure 10 is shown in the fully assembled state. The cell holder 14, which is no longer visible here and is made of the foam material, is now arranged inside the frame halves 18, which have now been assembled to one another and form the cell frame, which is not described in more detail.

Figure 3:
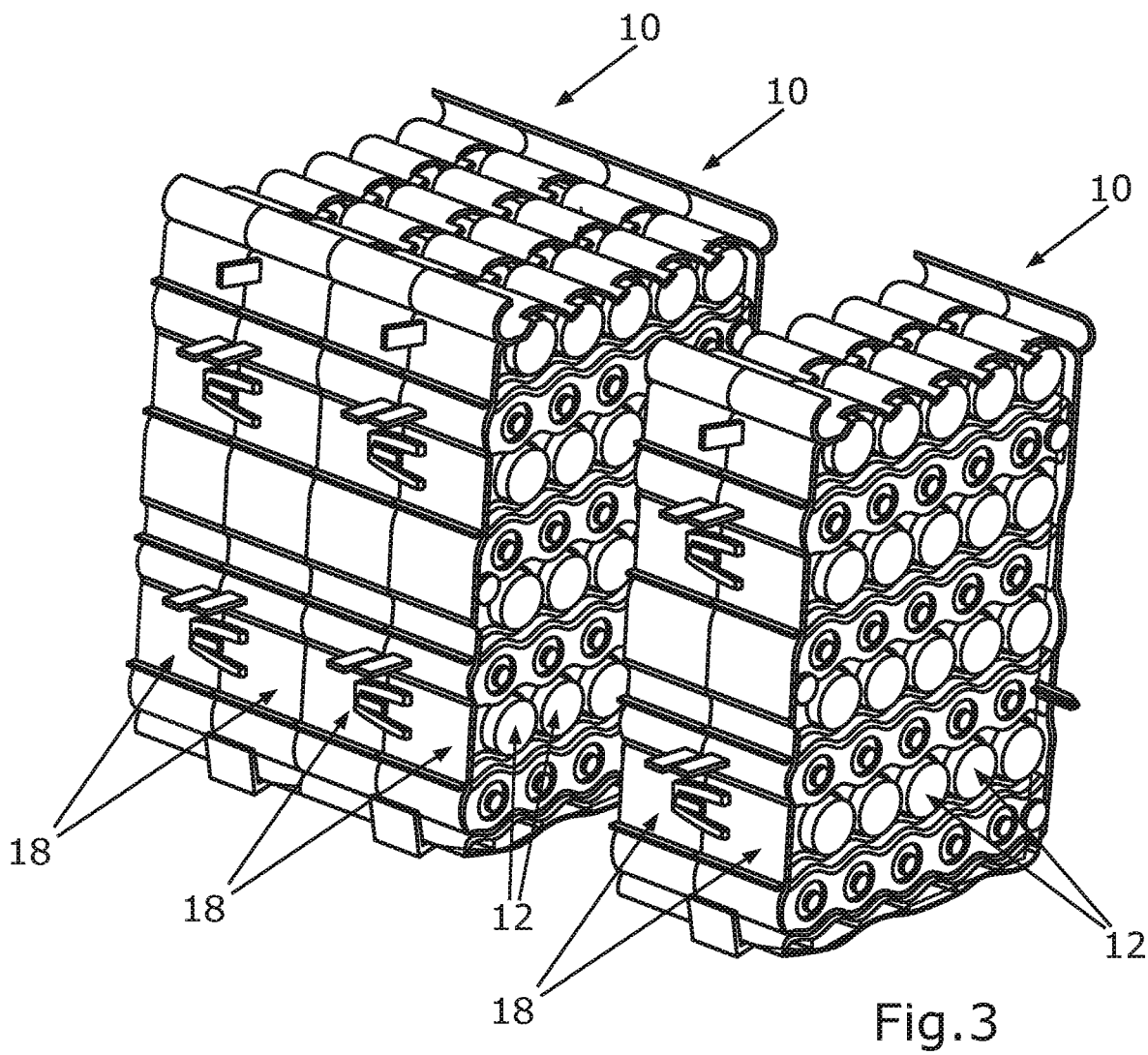
FIG. 3 depicts perspective view of several such recording structures.

In FIG. 3, several of the fully assembled receptacle structures 10 are shown in a perspective view. The cell holders formed from the frame halves 18 may, for example, be configured such that the respective frame halves 18 can be particularly easily assembled and secured to one another. Thus, it is possible to form several packages in the form of the ready-assembled receiving structures 10 and to mount them on one another in order to form, for example, respective battery modules.

Figure 4:
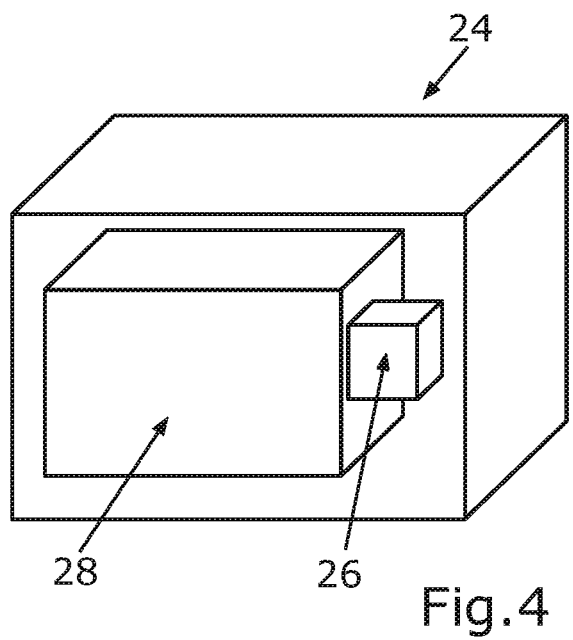
FIG. 4 depicts highly schematized illustration of a battery having a housing within which one or more of the receiving structures can be arranged, and a cooling system for cooling the battery cells.

In FIG. 4, a battery 24, which may be a high-voltage battery for a motor vehicle, is shown in a highly schematized view. The battery 24 may have one or more of the receiving structures 10 in its interior. By means of the receiving structures 10, as previously explained, a plurality of the battery cells 12 are received and fixed. Further, the battery 24 includes a cooling system 26 for cooling the battery cells 12 with the electrically non-conductive cooling fluid. For example, the cooling system 26 may include a pump by means of which the non-conductive cooling fluid may be conveyed through a cooling circuit. This allows the cooling medium to circulate within the battery 24 and remove excess heat from the battery cells 12.

In addition, the battery 24 may include a fluid-tight housing 28 in which one or more of the receiving structures 10 may be disposed. The housing 28 may include connections for supplying and removing the electrically non-conductive cooling medium, such that the electrically non-conductive cooling medium may be conveyed from the cooling system 26 to the interior of the housing 28 and thus to the battery cells 12 to be cooled, and may be conveyed back out of the housing 28 to remove heat.

Since the devices and processes described in detail above are exemplary embodiments, they can be modified to a large extent in the usual way by a person skilled in the art without leaving the field of the invention. In particular, the mechanical arrangements and the proportions of the individual elements to each other are simply exemplary. Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. A receiving structure for at least one of battery cells and a high-voltage battery for a motor vehicle, the receiving structure comprising:
   a cell holder comprising closed-cell, rigid, self-extinguishing foam material withrecesses configured for receiving and fixing the battery cells, and
   wherein the cell holder is configured such that, when the battery cells are arranged in the recesses, at least one region is recessed at the respective battery cells, so that an electrically non-conductive cooling medium can flow around the recessed region of the respective battery cells without penetrating the foam material.

2. The receiving structure according to claim 1 wherein the closed-cell foam material is rigid foam material.

3. The receiving structure according to claim 1, wherein:
   the recesses are cylindrical and are configured to radially fix the battery cells;
   the battery cells are configured as round cells; and
   at least respective end faces of the round cells are exposed when the round cells are arranged in the recesses.

4. The receiving structure according to claim 1, wherein the receiving structure comprises a cell frame, and wherein the cell holder is arranged at least partially within the cell frame.

5. The receiving structure according to claim 4, wherein the cell frame comprises two frame halves and the cell holder is arranged at least partially in a receiving space enclosed by the frame halves.

6. The receiving structure according to claim 4 wherein the cell frame is configured to be liquid-tight and the cell holder is arranged inside the cell frame comprising connections for supplying and discharging the electrically non-conductive cooling medium.

* * * * *